(12) United States Patent
Kuo et al.

(10) Patent No.: US 7,786,890 B2
(45) Date of Patent: Aug. 31, 2010

(54) NETWORK STATUS INDICATING CIRCUIT

(75) Inventors: Heng-Chen Kuo, Taipei Hsien (TW); Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 417 days.

(21) Appl. No.: 11/967,075

(22) Filed: Dec. 29, 2007

(65) Prior Publication Data

US 2009/0121892 A1    May 14, 2009

(30) Foreign Application Priority Data

Nov. 9, 2007    (CN) .................... 2007 1 0202457

(51) Int. Cl.
- *G08B 5/22* (2006.01)
- *G06F 17/50* (2006.01)
- *G05F 1/10* (2006.01)
- *H04J 3/16* (2006.01)
- *H04J 3/22* (2006.01)
- *H04L 12/413* (2006.01)
- *G08B 21/00* (2006.01)

(52) U.S. Cl. .................... 340/815.45; 703/14; 327/544; 370/468; 370/474; 370/447; 340/540; 340/635

(58) Field of Classification Search ............ 340/815.45, 340/540, 635; 703/14; 327/544; 370/468, 370/474, 447

See application file for complete search history.

(56) References Cited

U.S. PATENT DOCUMENTS

| | | | | |
|---|---|---|---|---|
| 5,596,575 A | * | 1/1997 | Yang et al. | 370/468 |
| 5,664,105 A | * | 9/1997 | Keisling et al. | 709/224 |
| 5,796,743 A | * | 8/1998 | Bunting et al. | 370/474 |
| 6,256,318 B1 | * | 7/2001 | O'Callaghan et al. | 370/447 |
| 2001/0043093 A1 | * | 11/2001 | Sakura et al. | 327/108 |
| 2002/0098868 A1 | * | 7/2002 | Meiksin et al. | 455/560 |
| 2003/0184363 A1 | * | 10/2003 | Lopata et al. | 327/544 |
| 2005/0210123 A1 | * | 9/2005 | Wang et al. | 709/218 |
| 2007/0277047 A1 | * | 11/2007 | Mehta et al. | 713/300 |
| 2008/0091400 A1 | * | 4/2008 | Hsieh et al. | 703/14 |

* cited by examiner

*Primary Examiner*—George A Bugg
*Assistant Examiner*—Jack Wang
(74) *Attorney, Agent, or Firm*—Frank R. Niranjan

(57) ABSTRACT

A network status indicating circuit includes a logic circuit, a switch circuit, and an indicating unit. The logic circuit includes nine input ends, a NOT gate, and two OR gates. The switch circuit includes two input ends and two output ends. The indicating unit includes two LEDs. The logic circuit is connected to the indicating unit to indicate the status of a network IC.

6 Claims, 3 Drawing Sheets

NETWORK STATUS INDICATING CIRCUIT

BACKGROUND OF THE INVENTION

1. Field of the Invention

The present invention relates to a network status indicating circuit, and particularly to a network status indicating circuit compatible with different types of network ICs.

2. Description of Related Art

There are two types of network status indicating circuit using indicating units such as LEDs: 1) a first type of network status indicating circuit indicates the networks according to the combination of two status signals designated Speed and Link, 2) a second type of network status indicating circuit indicates the network status according to two status signals independent from each other designated 10 M/LINK/ACTIVITY and 100 M/LINK/ACTIVITY. Referring to FIG. 2, the first type of indicating circuit includes a first type of network IC 10, a NOT gate U1, two LEDs L1, L2, and a resistor Ra. The network IC 10 includes a Speed pin connected to an anode of the LED L1 and an input terminal of a NOT gate. An output terminal of the NOT gate is connected to an anode of the LED L2. A node A between two cathodes of the two LEDs L1, L2 is connected to a Link pin of the network IC 10 through the resistor Ra. The NOT gate U1, the two LEDs L1, L2 and the resistor Ra constitute an indicator circuit. The network IC 10 is set in a kernel board, and the indicator circuit is set in a device board.

Level/value of the Link pin corresponding to the network status, and level/value of the Speed pin corresponding to the network transmitting speed are listed below:

TABLE 1

| Network status | Level/value of Link pin |
| --- | --- |
| Linked | Low/0 |
| Not linked | High/1 |
| Transmitting and Receiving | Alternating between 0, 1 |

TABLE 2

| Network transmitting speed | Level/value of Speed pin |
| --- | --- |
| 10 Mbps | High/1 |
| 100 Mbps | Low/0 |

According to Table 1, value at the Link pin is 0 when the network is "linked", and is 1 when the network is "not linked". When the network is "transmitting and receiving", the value at the Link pin alternates between 0 and 1. According to Table 2, the value at the Speed pin is 1 when the speed of the network is 10 Mbps, and is 0 when the speed of the network is 100 Mbps. So when the network speed is 10 Mbps and the network is "linked", the LED L1 lights up. When the network speed is 100 Mbps and the network is "linked", the LED L2 lights up. When the network speed is 10 Mbps and the network is "transmitting and receiving", the LED L1 blinks. When the network speed is 100 Mbps and the network is "transmitting and receiving", the LED L2 blinks. When the network is "not linked", the two LEDs L1 and L2 remain off.

Referring to FIG. 3, the second type of indicating circuit includes a second type of network IC 20, two resistors Rb, Rc, and two LEDs L3, L4. A 10 M/LINK/ACTIVITY pin of the network IC 20 is connected to an anode of the LED L3 through the resistor Rb, and a 100 M/LINK/ACTIVITY pin of the network IC 20 is connected to an anode of the LED L4 through the resistor Rc. Cathodes of the two LEDs L3 and L4 are grounded. The two resistors Rb and Rc, the two LEDs L3 and L4 constitute an indicator circuit. The network IC 20 is set in a kernel board, and the indicator circuit is set in a device board. When the network speed is 10 Mbps and the network is "linked", the LED L3 lights up. When the network speed is 100 Mbps and the network is "linked", the LED L4 lights up. When the network speed is 10 Mbps and the network is "transmitting and receiving", the LED L3 blinks. When the network speed is 100 Mbps and the network is "transmitting and receiving", the LED L4 blinks. When the network is "not linked", the two LEDs L3, L4 remain off.

According to the FIGS. 2 and 3, a network status indicating circuit is only compatible with a specified network IC, so different indicator circuits are needed corresponding to different network ICs. Sometimes the network IC in the kernel board must be exchanged for a different type, and so the indicator circuit in the device board must also be changed in accordance with the new network IC.

What is needed, therefore, is a network status indicating circuit which can solve the above the problem.

SUMMARY OF THE INVENTION

An exemplary network status indicating circuit is configured to indicate network status of different types of network ICs. The network status indicating circuit includes a logic circuit, a switch circuit, and an indicating unit. The logic circuit includes first to ninth input pins, a NOT gate, a first OR gate, and a second OR gate. The first input pin is connected to a first junction via the NOT gate. The second input pin is connected to the first junction. The third input pin is connected to an input end of the OR gate. The fourth input pin is connected to another input end of the first OR gate. The fifth input pin is connected to an input end of the second OR gate. The sixth input pin is connected to another input end of the second OR gate. The output ends of the first OR gate and the second Or gate are connected to a second junction. The seventh input pin is connected to the second junction. The switch circuit comprises a first input end, a second input end, a first output end, and a second output end. The first input end of the switch circuit is connected to the first junction. The second input end of the switch circuit is connected to the second junction. When the first input end and the second input end of the switch circuit are at low levels, the first output end of the switch circuit is at a high level, the second output end of the switch circuit is at a low level; when the first input end of the switch circuit is at a low level and the second input end of the switch circuit is at a high level, the first output end and the second output end of the switch circuit are at low levels; when the first input end of the switch circuit is at a high level and the second input end of the switch circuit is at a low level, the first output end of the switch circuit is at a low level, the second output end of the switch circuit is at a high level; when the first input end and the second input end of the switch circuit are at high levels, the first output end and the second output end of the switch circuit are at low levels. The indicating unit includes a first LED and a second LED. The anode of the first LED is connected to the first output end of the switch circuit and the eighth input pin. The anode of the second LED is connected to the second output end of the switch circuit and the ninth input pin. The cathode of the first LED and the second LED are grounded.

Other advantages and novel features of the present invention will become more apparent from the following detailed description of preferred embodiment when taken in conjunction with the accompanying drawings, in which:

DETAILED DESCRIPTION OF THE INVENTION

Figure 1:
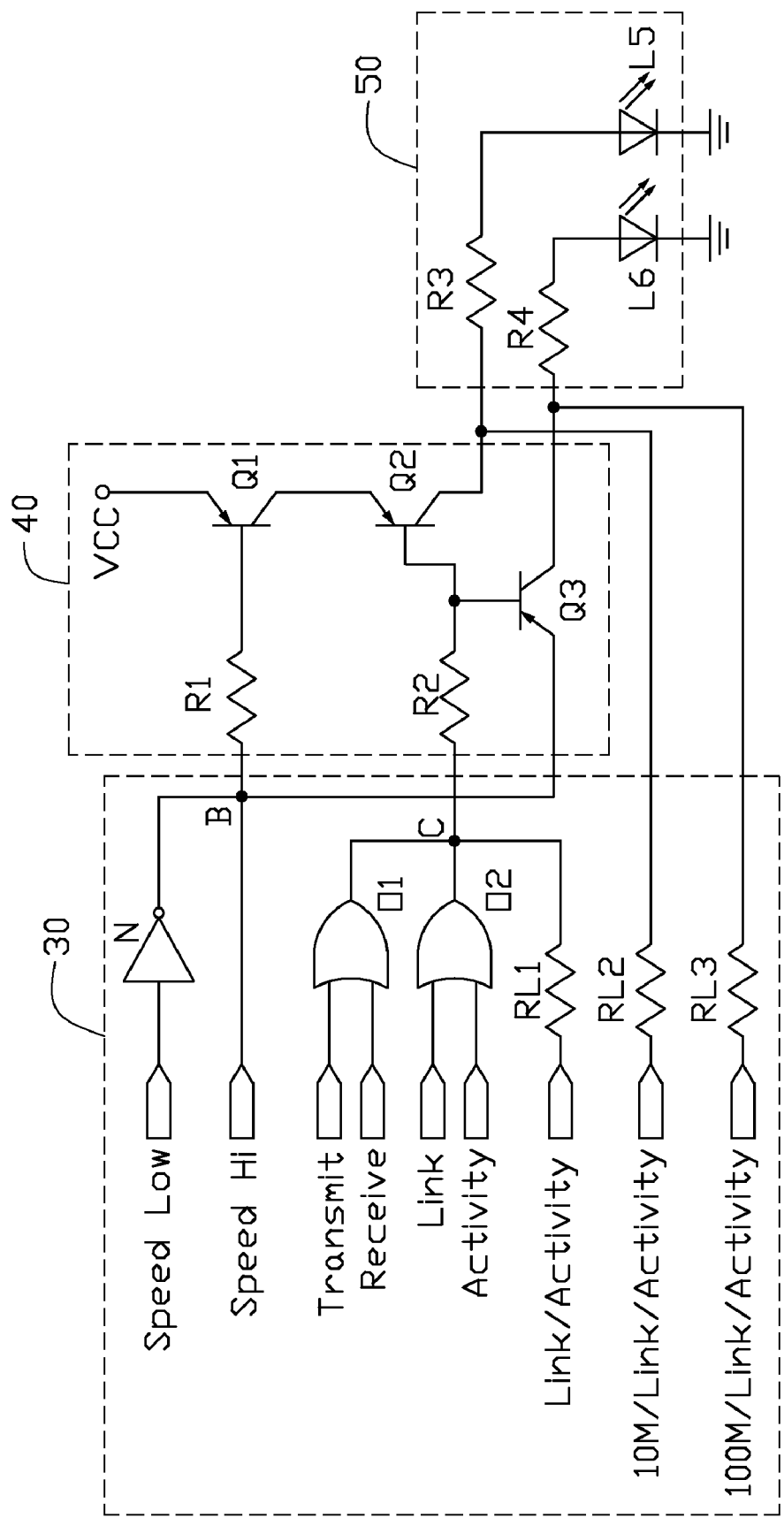
FIG. 1 is a circuit diagram of a network status indicating circuit according to a preferred embodiment of the present invention.
Figure 2:
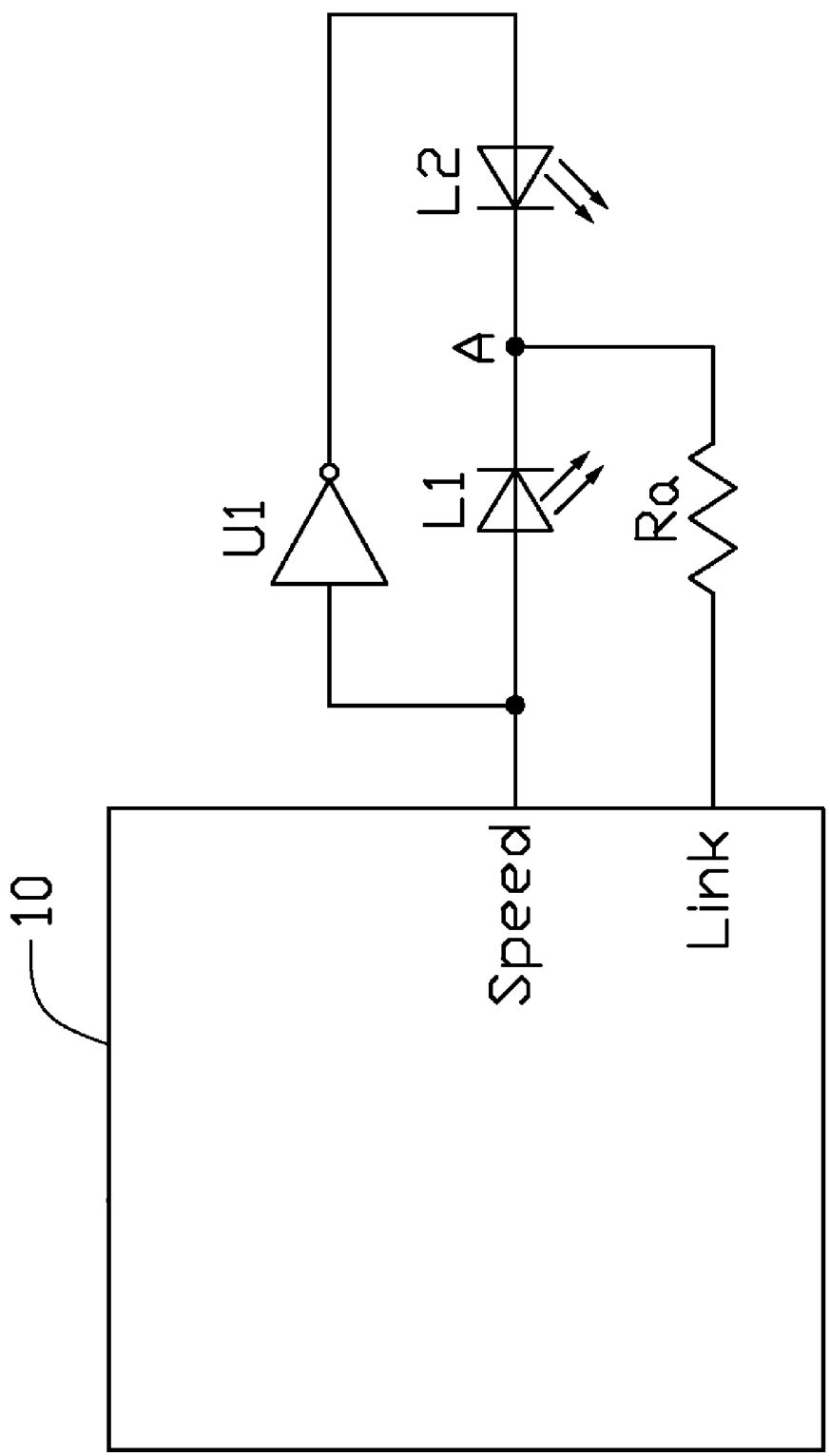
FIG. 2 is a circuit diagram of a conventional network status indicating circuit employing the combination of two status signals.
Figure 3:
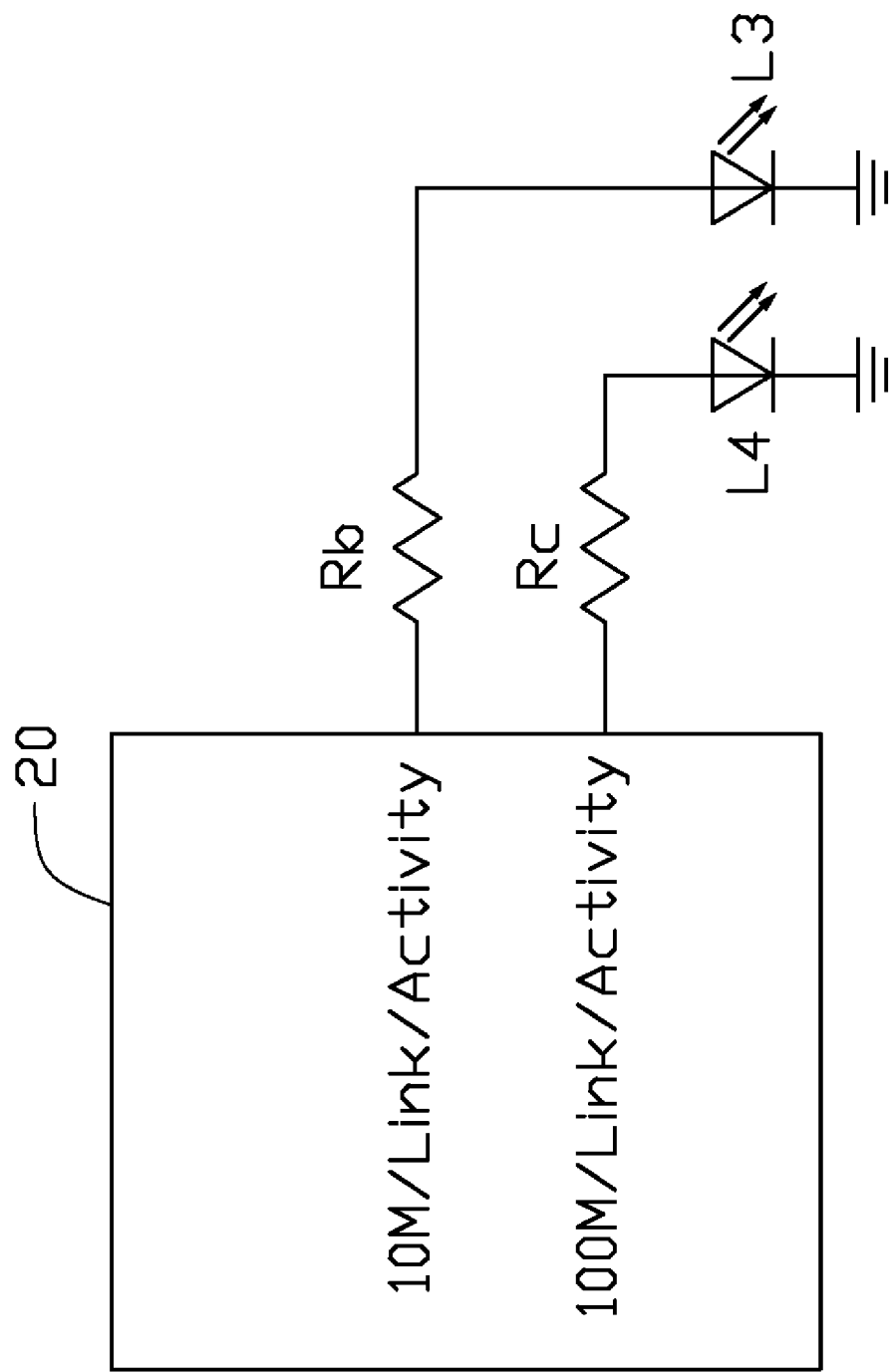
FIG. 3 is a circuit diagram of a conventional network status indicating circuit employing two signals independent from each other.

Referring to FIG. 1, a network status indicating circuit in accordance with a preferred embodiment of the present invention is shown. The network status indicating circuit includes a logic circuit 30, a switch circuit 40 and an indicating unit 50. An output end of the logic circuit 30 is connected to the indicating unit 50 via the switch circuit 40.

The logic circuit 30 includes a first input pin Speed Low, a second input pin Speed High, a third input pin Transmit, a fourth input pin Receive, a fifth input pin Link, a sixth input pin Activity, a seventh input pin Link/Activity, an eighth input pin 10 M/Link/Activity, and a ninth input pin 100 M/Link/Activity. The logic circuit 30 further includes a NOT gate N, and two OR gates O1 and O2.

The switch circuit 40 includes a first input end, a second input end, a first output end, and a second output end. In this embodiment, the switch circuit 40 includes a first pass element such as a PNP type transistor Q1, a second pass element such as a PNP type transistor Q2, and a third pass element such as a PNP transistor Q3. The base of the transistor Q1 is connected to the emitter of the transistor Q3 and acts as the first input end of the switch circuit 40. The base of the transistor Q2 is connected to the base of the transistor Q3 and acts as the second input end of the switch circuit 40. The collector of the transistor Q2 acts as the first output end of the switch circuit 40. The collector of the transistor Q3 acts as the second output end of the switch circuit 40. The indicating unit 50 includes two LEDs L5 and L6.

The first input pin Speed Low is connected to a junction B via the NOT gate N. The second input pin Speed High is directly connected to the junction B. The junction B is connected to the base of the transistor Q1 via a resistor R1, and the emitter of the transistor Q3. The third input pin Transmit is connected to an input end of the OR gate O1. The fourth input pin Receive is connected to another input end of the OR gate O1. The fifth input pin Link is connected to an input end of the OR gate O2. The sixth input pin Activity is connected to another input end of the OR gate O2. The output ends of the OR gates O1 and O2 are connected to a junction C. The junction C is connected to the bases of the transistor Q2 and the transistor Q3 via a resistor R2. The junction C is connected to the seventh input pin Link/Activity via a resistor RL1. The emitter of the transistor Q1 is connected to a power supply VCC. The collector of the transistor Q1 is connected to the emitter of the transistor Q2. The collector of the transistor Q2 is connected to the anode of the LED L5 via a resistor R3. The collector of the transistor Q3 is connected to the anode of the LED L6 via a resistor R4. The cathodes of the LEDs L5 and L6 are grounded. The eighth input pin 10 M/Link/Activity is connected to the collector of the transistor Q2 via a resistor RL2. The ninth input pin 100 M/Link/Activity is connected to the collector of the transistor Q3 via a resistor RL3.

The NOT gate N is configured to convert signals input from the first input pin Speed Low to be the same with signals input from the second input pin Speed High. The OR gate O1 is configured to integrate signals input to the third input pin Transmit and the fourth input pin Receive. The OR gate O2 is configured to integrate signals input to the fifth input pin Link and the sixth input pin Activity.

For example, a network IC type SMSC LAN8700 includes a Link pin, an Activity pin, and a Speed High pin. To indicate network status of the network IC type SMSC LAN8700, it needs to connect the Link pin of the network IC type SMSC LAN8700 to the fifth input pin Link of the logic circuit 30, the Activity pin of the network IC type SMSC LAN8700 to the sixth input pin Activity of the logic circuit 30, and the Speed High pin of the network IC type SMSC LAN8700 to the second input pin Speed High of the logic circuit 30.

When the network is "linked" and the speed of the network is 100 M, value at the Speed High pin of the network IC type SMSC LAN8700 is 1, value at the Link pin and the Activity pin of the network IC type SMSC LAN8700 alternates between 0 and 1. As a result, value at the junction B is 1, and value at the junction C alternates between 0 and 1. The transistor Q1 is turned off. When value at the junction C is 0, the transistor Q2 and Q3 are both turned on. The collector of the transistor Q2 outputs a low level voltage, and the LED L5 doesn't light up. The collector of the transistor Q3 outputs a high level voltage, and the LED L6 lights up. When value at the junction C is 1, the transistors Q2 and Q3 are both turned off, and the LEDs L5 and L6 don't light up. In the above-description, when the network is "linked" and the speed of the network is 100 M, the LED L5 doesn't light up, and the LED L6 blinks.

When the network is "linked" and the speed of the network is 10 M, value at the Speed High pin of the network IC type SMSC LAN8700 is 0, value at the Link pin and the Activity pin of the network IC type SMSC LAN8700 alternates between 0 and 1. As a result, value at the junction B is 0, and value at the junction C alternates between 0 and 1. The transistor Q1 turns on. When value at the junction C is 0, the transistors Q2 and Q3 both turn on. The collector of the transistor Q2 outputs a high level voltage, and the LED L5 lights up. The collector of the transistor Q3 outputs a low level voltage, and the LED L6 doesn't light up. When value at the junction C is 1, the transistors Q2 and Q3 both turn off, and the LEDs L5 and L6 are both unlit. In the above-description, when the network is "linked" and the speed of the network is 10 M, the LED L5 blinks, and the LED L6 is unlit.

In the above-description, pins of a network IC must be connected to the input pins of the logic circuit 30 accordingly to indicate status of the network IC.

The network status indicating circuit is compatible with many types of network ICs. Thus reducing costs and saving time in the design process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A network status indicating circuit configured to indicate network status of different types of network ICs, the network status indicating circuit comprising:

a logic circuit comprising first to ninth input pins, a NOT gate, a first OR gate, and a second OR gate, the first input pin connected to a first junction via the NOT gate, the second input pin connected to the first junction, the third input pin connected to an input end of the OR gate, the fourth input pin connected to another input end of the first OR gate, the fifth input pin connected to an input end of the second OR gate, the sixth input pin connected to another input end of the second OR gate, the output ends of the first OR gate and the second Or gate connected to a second junction, the seventh input pin connected to the second junction;

a switch circuit comprising a first input end, a second input end, a first output end, and a second output end, the first input end connected to the first junction, the second input end connected to the second junction, wherein when the first input end and the second input end of the switch circuit are at low levels, the first output end of the switch circuit is at a high level, the second output end of the switch circuit is at a low level; when the first input end of the switch circuit is at a low level and the second input end of the switch circuit is at a high level, the first output end and the second output end of the switch circuit are at low levels; when the first input end of the switch circuit is at a high level and the second input end of the switch circuit is at a low level, the first output end of the switch circuit is at a low level, the second output end of the switch circuit is at a high level; when the first input end and the second input end of the switch circuit are at high levels, the first output end and the second output end of the switch circuit are at low levels; and an indicating unit comprising a first LED and a second LED, the anode of the first LED connected to the first output end of the switch circuit and the eighth input pin, the anode of the second LED connected to the second output end of the switch circuit and the ninth input pin, the cathode of the first LED and the second LED being grounded.

2. The network status indicating circuit as claimed in claim 1, wherein the first input pin is a Speed Low terminal, the second input pin is a Speed High terminal, the third input pin is a Transmit terminal, the forth input pin is a Receive terminal, the fifth input pin is a Link terminal, the sixth input pin is an Activity terminal, the seventh input pin is a Link/Activity terminal, the eighth input pin is a 10 M/Link/Activity terminal, the ninth input pin is a 100 M/Link/Activity terminal.

3. The network status indicating circuit as claimed in claim 1, wherein the switch circuit comprises a first pass element, a second pass element, and a third pass element, a first terminal of the first pass element is connected to a third terminal of the third pass element and acts as the first input end of the switch circuit, a first terminal of the second pass element is connected to a first terminal of the third pass element and acts as the second input end of the switch circuit, a second terminal of the first pass element is connected to a second terminal of the second pass element, a third terminal of the first pass element is connected to a power supply, a second terminal of the second pass element acts as the first output end of the switch circuit, a second terminal of the third pass element acts as the second output end of the switch circuit.

4. The network status indicating circuit as claimed in claim 3, wherein the first pass element is an NPN transistor, the first terminal, the second terminal, and the third terminal of the first pass element are respectively the base, the collector, and the emitter of the NPN transistor.

5. The network status indicating circuit as claimed in claim 3, wherein the second pass element is an NPN transistor, the first terminal, the second terminal, and the third terminal of the first pass element are respectively the base, the collector, and the emitter of the NPN transistor.

6. The network status indicating circuit as claimed in claim 3, wherein the third pass element is an NPN transistor, the first terminal, the second terminal, and the third terminal of the third pass element are respectively the base, the collector, and the emitter of the NPN transistor.

* * * * *